Aug. 21, 1934.  B. J. CLAPPER  1,970,546
NOZZLE
Filed April 13, 1934  2 Sheets-Sheet 1
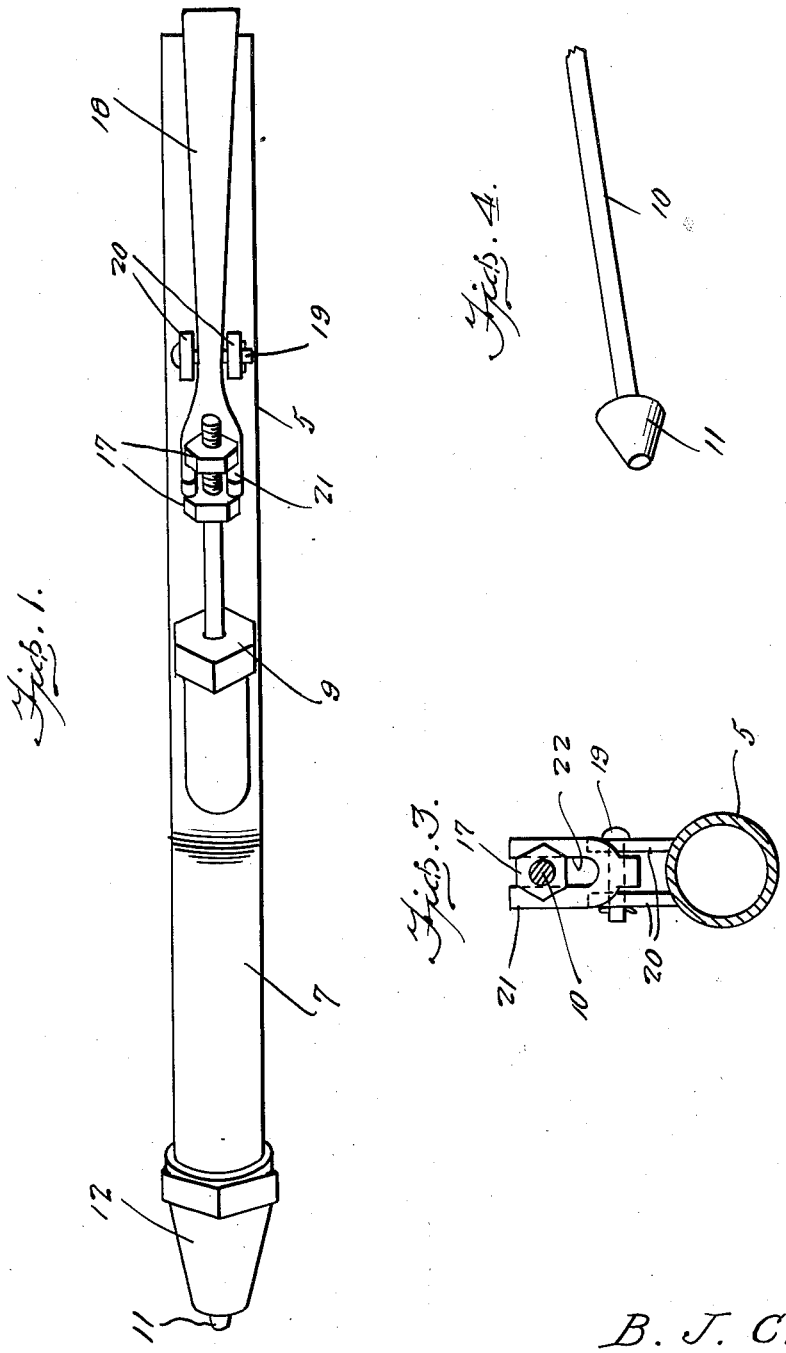
Inventor
B. J. Clapper
By Clarence A. O'Brien
Attorney Aug. 21, 1934.   B. J. CLAPPER   1,970,546
NOZZLE
Filed April 13, 1934   2 Sheets-Sheet 2
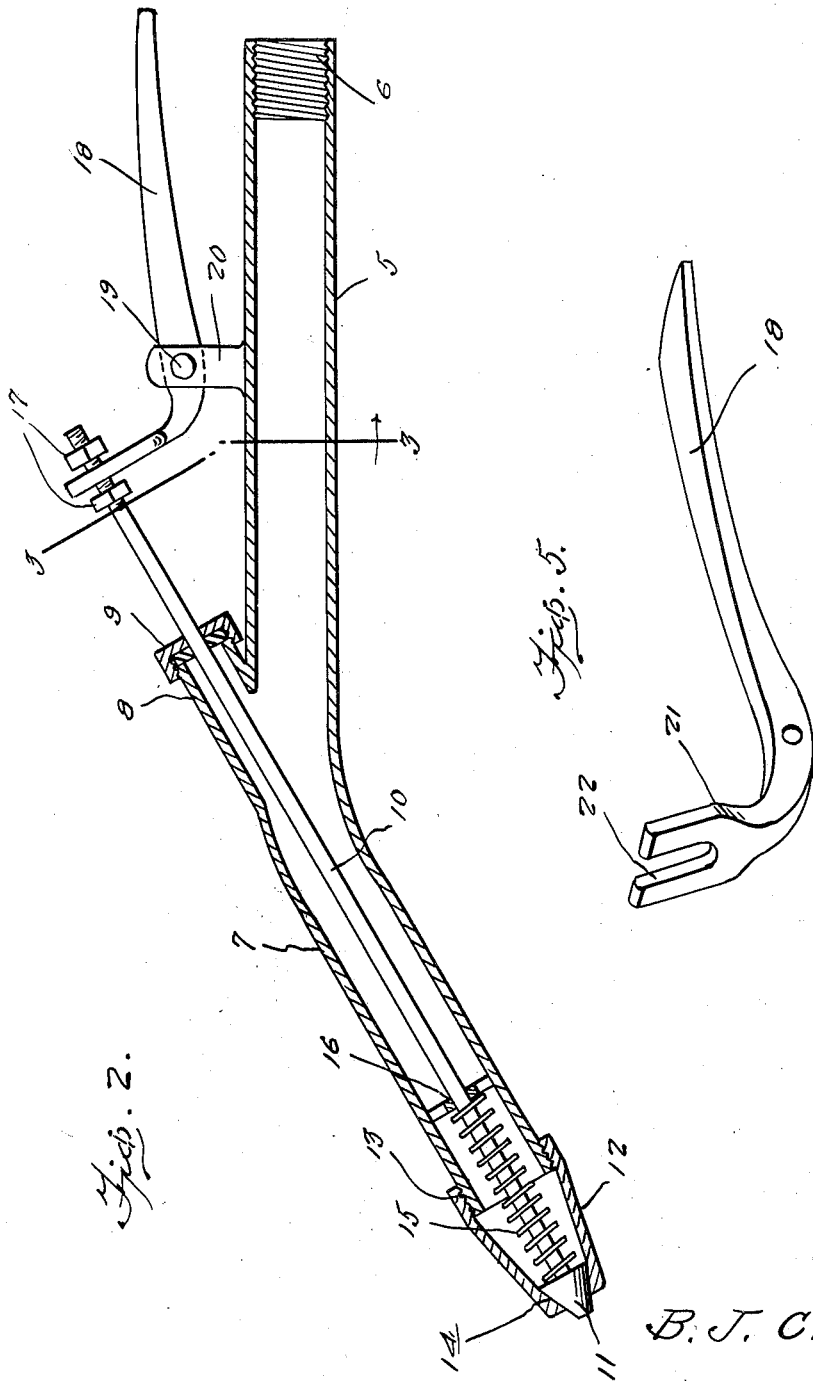
Inventor
B. J. Clapper
By Clarence A. O'Brien
Attorney Patented Aug. 21, 1934

1,970,546

UNITED STATES PATENT OFFICE 1,970,546

NOZZLE

Bryan J. Clapper, Tabor, Iowa, assignor of one-half to R. F. Weatherhead, Tabor, Iowa Application April 13, 1934, Serial No. 720,483

2 Claims. (Cl. 221—100)

This invention has as its object the improvement in nozzles generally and in particular to a hose nozzle.

Briefly the invention consists in the provision of an improved and efficient nozzle for use on the discharge end of the hose of a gasoline pump.

In accordance with the present invention a nozzle of simple construction and efficient design is provided and wherein the parts of the nozzle are readily accessible and can be easily replaced.

The invention together with its objects and advantages will be best understood from a study of the following description taken in connection with the accompanying drawings wherein:

Figure 1 is a top plan view of the nozzle.

Figure 2 is a sectional view therethrough, certain parts being shown in elevation.

Figure 3 is a sectional view taken substantially on the line 3—3 of Figure 2.

Figure 4 is a perspective view of a valve member and its stem, and

Figure 5 is a perspective view of a valve operating lever.

Referring to the drawings by reference numerals it will be seen that the nozzle comprises a body 5 which is preferably tubular and is of any suitable length. At one end the body 5 is provided with threads 6 for connection with one end of a hose, especially a gasoline pump hose. At the end thereof opposite to the threads 6 the body 5 is provided with an integral elongated head 7 that extends at an obtuse angle to the body 5 being diagonal to the body. At the junction of the body 5 and head 7 there is provided an integral neck 8 provided with a gland 9 through which is slidable the stem 10 of a conical valve member 11.

At the free end thereof the head 7 is externally threaded and is adapted to have screwed thereon a removable tip 12. The tip 12 is formed of metal and is substantially conical, its largest end being internally threaded for screw threaded engagement with the free end of the head 7 as at 13. At its smallest or discharge end the tip 12 is provided with a tapered or conical discharge orifice 14 in which the valve 11 seats for closing the discharge end of the nozzle. The valve 11 is normally engaged in the orifice 14 through the medium of a coil spring 15 disposed about the stem 10 between the valve 11 and a spider like guide 16 arranged within the head 7 and secured therein in any suitable manner, the hub of the guide 16 slidably accommodating the valve stem 10 as shown in Figure 2.

On the end thereof opposite to the valve 11, stem 10 is provided with threads and spaced nuts 17 are threaded on this end of the stem 10 as shown in Figure 2.

A control lever for the valve is provided and indicated by the reference numeral 18. The lever 18 is pivoted as at 19 between a pair of upstanding lugs or ears 20 provided on the top of the body 5, and at its pivoted end lever 18 is provided with a head 21 disposed substantially at right angles to the lever 18 and notched, bifurcated or otherwise formed as at 22 to straddle the stem 10 between the nuts 17. Thus a loose working connection is provided between the lever 18 and the valve stem 10.

Normally the valve 11 is in seated or closed position. When it is desired to unseat the valve 11 to permit the passage of gasoline or other fluid through the orifice 14 the operator with the same hand holding the body 5 presses on the lever 18 to move the same inwardly toward the body 5. This movement of the lever 18 will cause head 21 to engage with the outermost nut 17 on the stem 10 resulting in a pull being exerted on the stem 10 in opposition to the spring 15 for unseating the valve 11 and thus opening the port 14 the desired amount to permit passage of the fluid through the port or orifice 15.

It will thus be seen that a nozzle of this character may be associated with the end of a hose such as a gasoline pump hose and that with this nozzle the discharge of the fluid may be readily controlled by the operator.

Having thus described my invention, what I claim as new is:

1. A nozzle of the character described comprising a tubular body having a tubular head at one end disposed diagonally to the body, said body at its free end being provided for engagement with one end of a hose or the like, a removable tip on the free end of said head provided with a discharge orifice, a valve member engaging said orifice for closing the same, said valve member having a stem extending longitudinally through the head, spring means engaged with the stem for normally retaining the valve member engaged in the orifice, a lever pivotally mounted on said body and having a head offset from the body of the lever and straddling the free end of said stem, and nuts threaded on the free end of the stem and between which the head of said lever operates, and with which said head is engageable for unseating the valve.

2. A nozzle having a removable substantially conical tip provided at its apex with a conical discharge orifice, a conical valve member adapted to seat within said orifice, a stem connected with the valve member and extending longitudinally through the nozzle, a guide for the stem arranged in the nozzle, a spring disposed about the stem between said guide and the valve yieldably retaining the valve in seated position, a lever pivotally mounted on the nozzle, and an operating connection between said lever and the free end of said stem.

BRYAN J. CLAPPER.